INVENTOR.
Robert P. Alger
Maurice P. Tixier
BY John P. Sinnott
ATTORNEY

United States Patent Office 3,508,438
Patented Apr. 28, 1970

3,508,438
WELL LOGGING APPARATUS AND METHOD
Robert P. Alger and Maurice P. Tixier, Houston, Tex., assignors to Schlumberger Technology Corporation, New York, N.Y., a corporation of Texas
Filed June 27, 1967, Ser. No. 649,212
Int. Cl. E21b 49/00
U.S. Cl. 73—152
13 Claims

ABSTRACT OF THE DISCLOSURE

One embodiment of the invention provides a technique for approximating the irreducible water saturation, $S_{wirr}$, in sand or sandstone type of formations surrounding a borehole, by comparing the true formation porosity, $\phi$, with the free fluid index, FFI, of the formation. This information enables the formation permeability, $k$, to be computed. Additional parameters such as the resistivity of the uncontaminated portion of the formation, $R_t$, and the formation water resistivity, $R_w$, can be combined with $S_{wirr}$ to identify oil- and gas-bearing formations. Specific logging tools are described that incorporate equipment for measuring FFI through nuclear magnetism logging and $\phi$ through gamma ray, neutron or sonic techniques.

BACKGROUND OF THE INVENTION

The field of the invention

This invention relates to well logging methods and apparatus, and more particularly, to methods and apparatus for deducing the permeability of the earth formations surrounding a borehole, and the like.

Description of the prior art

Ordinarily, the oil-bearing potential of an earth stratum is identified through the porosity of the formation, the more porous formations generally providing the most likely production horizons. The pores, however, are never completely filled with oil, but also contain an irreducible amount of water. The volume of this irreducible water depends to a large extent on a relation between the pore surfaces and the pore volume. This relation also governs the ease with which liquids pass through the formation, i.e., the formation permeability. Thus, in a given reservoir formation, there are interrelationships between the potential irreducible water saturation and the permeability. Both of these factors, moreover, are influenced by the formation porosity.

Borehole logging tools have been proposed to measure porosity by analyzing, for example, the characteristics of sound, neutrons or gamma rays in the earth formation. These proposed tools, however, although capable of accurately measuring porosity, do not measure permeability directly. Accordingly, a bare porosity measurement can be misleading, and a tool is needed that will indicate the ease with which fluids flow through a formation.

Logs that measure the electrical resistivity of earth formations have been suggested for permeability measurements. Basically, these electrical resistivity methods strive to measure permeability through the fluid displacement phenomena characterizing mud-filled boreholes.

Typically, a drilling mud is a mixture of solid matter in oil or water that is circulated in the borehole to lubricate the drill bit, flush drill cuttings out of the borehole and maintain borehole pressure control. Because of the higher pressure in the borehole mud, fluids in the mud seep into the surrounding formations and deposit a layer of solid matter, or mudcake, on the borehole wall. In the portion of the formation immediately adjacent to the mudcake, the seeping fluid, or mud filtrate, produces a "flushed zone" in which the filtrate almost completely displaces the natural formation liquids. Further into the formation, the fluid displacement by the invading filtrate is not complete. In this situation, the pores contain a mixture of mud filtrate, formation water and oil, if oil is present. Accordingly, a measurement of the electrical resistances of these different portions of the formation ought to provide some indication of the ease with which fluids can flow through the formation under study. Measurements of this nature can succeed, however, only in the most favorable conditions, and even in these circumstances, the measurements usually produce just a qualitative indication of permeability.

A further indication of the nature of the fluids within the pores, whether they are water, gas, oil or some combination of these substances would be a desirable addition to a permeability log.

Thus, it is an object of the invention to provide an improved and more accurate measurement of formation permeability in sand or sandstone formation.

It is a further object of the invention to provide an improved and more accurate log of formation permeability in addition to a method of characterizing the fluids within sand or sandstone formations.

SUMMARY

In oil sands, the permeability of a formation, $k$, may be approximately related to the formation porosity, $\phi$, in the following manner:

$$k^{1/2} = \frac{250\phi^3}{S_{wirr}} \quad (1)$$

where $S_{wirr}$ is the irreducible formation water saturation, a ratio of the volume of formation water that cannot be displaced by oil to the effective pore volume of that formation.

To solve Equation 1, formation porosity, $\phi$, can be measured through one of the aforementioned logging techniques. A reasonably accurate value of the irreducible water saturation, however, is an elusive parameter that ordinarily is not capable of direct measurement. In accordance with the invention, $S_{wirr}$ may be approximated, for example, in sandstone by assuming that the free fluid index (FFI) is related to the displaceable or movable liquid in the formation.

The free fluid index may be determined through nuclear magnetic logging techniques. These techniques typically apply a strong magnetic field to the strata surrounding a borehole to excite some of the formation constituents. This strong field tends to polarize, or orient in one direction, the magnetic moments of the hydrogen nuclei in the formation fluids that are relatively free to move. Removing the polarizing field in a predetermined manner causes the free hydrogen nuclei to shift their polar orientation and to precess about the earth's magnetic field. This latter precession induces a current in a coil that can be manipulated to indicate the abundance of relatively free hydrogen nuclei within the formation. Hydrogen nuclei which are contained in the small formation pores do not contribute to the measured signal, since they become disoriented before this signal can be observed. Thus, the FFI value represents only the liquid which is contained in the larger, potential oil-bearing pores.

Thus, by subtracting the free fluid index from the porosity, the remainder ought to be a measure of those fluids that ordinarily cannot be displaced, the irreducible water saturation, $S_{wirr}$. By applying this assumption to Equation 1, a new relationship for permeability is developed:

$$k^{1/2} = \frac{250\phi^3}{1 - \frac{FFI}{\phi}} \quad (2)$$

Equation 2 is substantially correct, even when the pores contain gas. In this latter situation, formation gas depresses the free fluid index signal. Gamma ray techniques in the presence of gas-bearing formations, however, generally tend to indicate a greater porosity than that which actually exists. Consequently, these two effects approximately compensate each other, and thereby enable Equation 2 to provide a reasonably satisfactory value of formation permeability.

More particularly, the invention provides one well logging tool or sonde that houses nuclear magnetic logging and porosity measuring equipment. Analog or digital computing means are provided on the earth's surface for combining the signals from the tool in accordance with Equation 2 to compute permeability.

Because this tool enables all of the required data to be taken during one logging run, the time needed to log a borehole is reduced in comparison with a log produced from data acquired through separate logging runs.

With these and other objects in mind, the features and advantages of the present invention will be best understood from the following description when read in conjunction with the accompanying drawings. It will be understood that the description and accompanying drawings are for the purposes of illustrating a preferred embodiment and not to be construed as defining the scope or limits of the invention, reference being had for the latter purpose to the appended claims.

DESCRIPTION OF THE PREFERRED EMBODIMENTS

Figure 1:
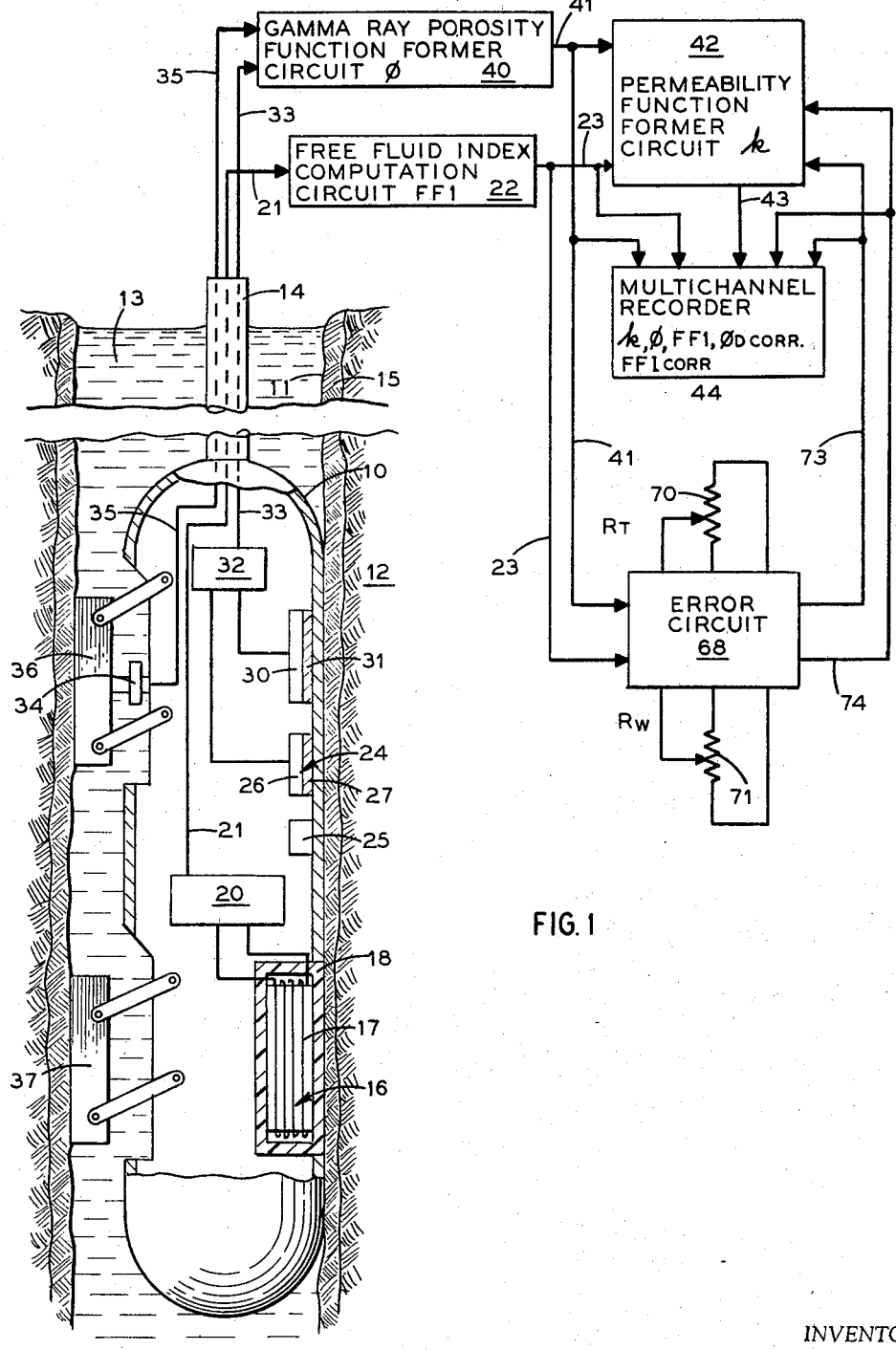
FIG. 1 is a schematic drawing in partial section of one embodiment of a logging tool in accordance with the invention showing the associated electrical circuits in block diagram form.

An illustrative embodiment of a practical apparatus for indicating formation permeability in accordance with principles of the invention is shown in FIG. 1.

The apparatus comprises a fluid-tight pressure resistant housing 10 adapted to pass through a borehole 11 that traverses earth formations 12. The borehole 11 is filled with a water-base or oil-base drilling mud 13, as shown. Housing 10 is suspended in the borehole 11 by an armored cable 14 which may contain a group of insulated conductors for transmitting signals to the earth's surface. A winch (not shown) located at the surface of the earth is used to lower and raise the housing in the borehole in the customary manner to traverse the earth formations 12. The borehole 11 is lined with a mudcake 15.

The lowermost portion of the housing 10 encloses a nuclear magnetic logging device 16. The nuclear magnetic logging device 16 has a coil 17 adjacent to one side of the housing 10. The coil 17 is encased in a non-magnetic insert 18 made, for example, of a rigid plastic material. A magnetic field is induced in the formation 12 by the coil 17 which causes the magnetic moments of hydrogen nuclei, or protons, within the formation that are not physically prevented from responding, to polarize, or align in one direction relative to the applied magnetic field. This effect is akin to the polarization of iron filings in a magnetic field, in which freely movable filings align with the applied field. If, however, some of the filings are not free to move, glued, for example, to a massive structure, these latter filings could not change position in response to the applied magnetic field. Thus, the coil 17 polarizes only the protons in the formation that are chemically bound in a fluid state. Protons that are a part of the crystalline structure of the formation, or subject to some prevailing antipolarizing influence, do not respond to the applied field. The responding protons, then, largely are an indication of the movable hydrogenous fluid within the earth formation 12.

To measure this latter quantity, the applied magnetic field is turned off in a predetermined manner after the relatively free protons in the formation have been polarized. Upon termination of the applied field, these polarized hydrogen nuclei commence to precess, in the manner of a gyroscope, about the earth's magnetic field and in so precessing, induce a current in the coil 17. Appropriate manipulation of the induced current provides a signal that corresponds to the free fluid index for the formation 12, as described in more complete detail in U.S. patent application Ser. No. 537,475, filed Mar. 25, 1966 for "Nuclear Magnetism Logging System," and U.S. patent application Ser. No. 599,527, filed Dec. 6, 1966 for "Nuclear Magnetism Signal Analyzing System," of John H. Baker, Jr., applicant, and assigned to the same assignee as the invention described herein.

Thus, the signal induced in the coil 17 by the hydrogenous fluid in the formation 12 is processed for transmission to the earth's surface in a switch unit and amplifier circuit 20, which also provides the power that energizes the coil 17 in order to establish the initial polarizing field. The processed signal from the circuit 20 is transmitted up the borehole 11 through a conductor 21 in the cable 14 to a free fluid index computation circuit 22. The computation circuit 22 applies a signal to an output conductor 23 that corresponds to the free fluid index of the liquids within the earth formation 12.

In order to compute the permeability, $k$, of the formation 12 in accordance with Equation 2, a signal that corresponds to the porosity, $\phi$, of the earth formation 12 also is required. To obtain an accurate porosity signal, a gamma-gamma ray density tool 24 is spaced longitudinally above the nuclear magnetic logging device 16 within the housing 10.

As described in more complete detail in U.S. patent application Ser. No. 243,300, filed Dec. 10, 1962 for "Compensated Gamma-Gamma Logging Tool" by John S. Wahl and assigned to the assignee of the invention described herein, now U.S. Patent No. 3,321,625 issued May 23, 1967, the density tool 24 comprises a source of gamma radiation 25, such as Cesium 137 ($Cs^{137}$). A short spaced gamma ray detector 26 is positioned longitudinally above and in alignment with the source 25. A filter 27 is interposed between the detector 26 and the housing 10 and the mudcake 15 to absorb low energy gamma rays that are not characteristic of the formation mudcake density.

A long spaced gamma ray detector 30 is positioned longitudinally above and more distant from the source 25 than the short spaced detector 26. A low-energy gamma ray absorbing filter 31 also is interposed between the detector 30 and the housing 10 and the mudcake 15. The detectors 26 and 30 are, moveover, equipped with shielding (not shown) within the housing 10 to attenuate direct radiation between the source 25 and the detectors.

Signals from the detectors 26 and 30 are sent to a signal processing circuit 32 within the housing 10. The circuit 32 amplifies and scales the signals from the detectors for transmission to the earth's surface through a conductor 33 in the cable 14.

The entire housing 10 is disposed eccentrically within the borehole by backup pads 36 and 37 which are pivotally mounted on the housing 10. The pads urge the nuclear magnetic logging device 16 and the gamma ray tool 24 against the formation 12. A borehole caliper 34, associated with the backup pad 36, sends a signal to the earth's surface through a conductor 35 in the cable 14 that corresponds to changes in the borehole diameter. Typically, a variable potentiometer can provide a satisfactory caliper. The signal from the caliper 34 produces some indication of the thickness of the mudcake 15 immediately adjacent to the detectors 26 and 30.

The mudcake thickness signal in the conductor 35 and gamma ray attenuation signals transmitted through the conductor 33 are applied to a gamma ray porosity function former circuit 40.

The gamma ray porosity function former circuit 40 converts the signals in conductors 33 and 35 into an output signal in a conductor 41 that corresponds to the porosity of the earth formation 12 adjacent to the density tool 24. The porosity signal is compensated by the circuit 40 for the thickness of the mudcake 15 in a manner described in more complete detail in the aforementioned Wahl patent application.

Because the physical mechanism of gamma ray attenuation within the formation 12 is more directly a measure of density, the density-related signals in the conductor 33 are converted by the circuit 40 into a porosity signal in accordance with the equation.

$$\phi_d = \frac{\rho_g - \rho_b}{\rho_g - \rho_f} \quad (3)$$

where $\phi_d$ is the formation porosity derived from the gamma ray density tool 24; $\rho_g$ is the grain density of the formation matrix, a constant for each formation mineral composition; $\rho_b$ is the bulk density of the formation as determined through the abovedescribed gamma ray measurements; and $\rho_f$ is the density of the fluid occupying the pore space within the formation 12 which usually is given a value of 1 gm./cc.

In accordance with the invention, the signals that correspond to $\phi_d$ in the conductor 41 and FFI in the conductor 23 are combined in a permeability function former circuit 42 to produce a signal that corresponds to permeability, $k$.

Assuming that the free fluid index is a measure of the movable liquid in the formation 12, the ratio $$FFI/\phi \quad (4)$$

ought to be an index of the formation's potentially movable fluid. This assumption is particularly true in sandstone formations, because some of the hydrogen in the water within the sandstone pores does not contribute to the FFI signal as measured by this technique. In this circumstance, the free fluid index more nearly approaches a measurement of the movable liquid in the formation, rather than a measurement of the total amount of oil and water.

Accordingly, based on this reasoning, the potential irreducible water saturation is computed:

$$S_{wirr} = 1 - \frac{FFI}{\phi} \quad (5)$$

Consequently, permeability can be computed by applying expression 5 to the denominator of Equation 1 for many formations of interest. Thus, $$k^{1/2} = \frac{250\phi^3}{1 - \frac{FFI}{\phi}} \quad (6)$$

Replacing $S_{wirr}$ in Equation 1 with Equation 5 provides a substantially more accurate value of permeability than heretofore available, inasmuch as values for $S_{wirr}$ often were determined only on the basis of rough estimates derived from limited field experience.

Turning once more to FIG. 1, the porosity signal transmitted through the conductor 41 and the free fluid index signal transmitted through the conductor 23 are applied to the permeability function former circuit 42. The permeability function former circuit 42 can be a suitable arrangement of operational amplifiers with appropriate input and feedback resistances to combine the $\phi_d$ and FFI signals and produce an output signal $k$ in accordance with Equation 6. Alternatively, appropriate combinations digital computing equipment can be arranged to solve Equation 6.

The permeability circuit 42 applies an output signal to a conductor 43 that corresponds to the formation permeability, $k$. The conductor 43 is connected to a conventional multichannel recorder 44 along with conductors 23 and 41.

In response to input signals on these conductors, the recorder 44 produces traces of permeability, formation porosity and free fluid index as a function of borehole depth. This record of the free fluid index and formation porosity enables the automatically computed value of formation permeability to be checked occasionally through hand computation.

The invention is independent of the physical mechanism through which the true formation porosity, $\phi$, is derived. Thus, for example, formation porosity determined through core samples or neutron diffusion effects would be satisfactory.

Figure 2:
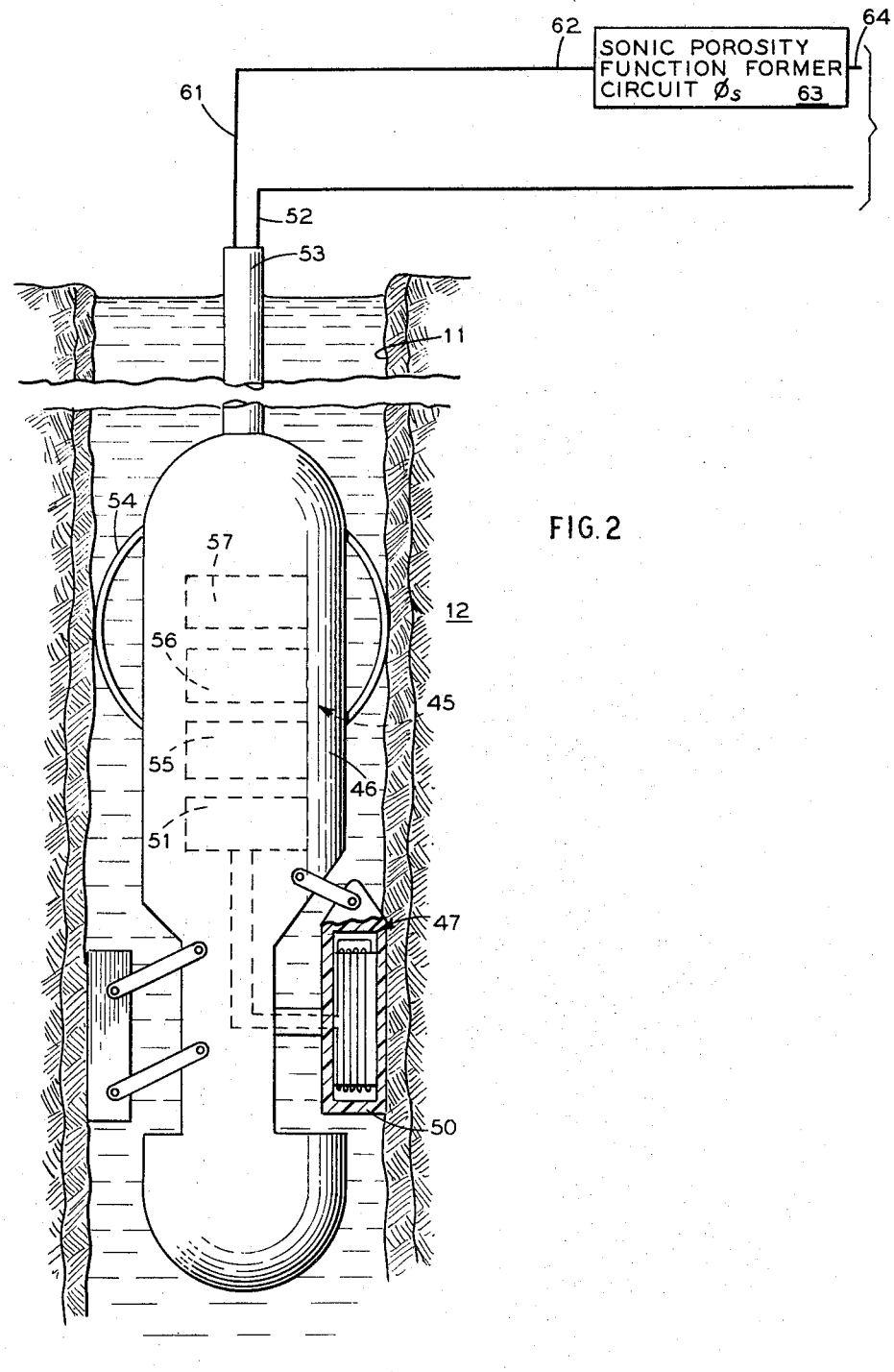
FIG. 2 is a schematic drawing in partial section of another embodiment of a logging tool according to the invention.

Illustratively, an alternative embodiment of the invention that is especially suited for use with sand formations is shown in FIG. 2. Formation porosity, $\phi$, is provided by a sonic device 45 in a housing 46 which also accommodates a nuclear magnetic logging device 47. The nuclear magnetic logging device 47 is mounted in a pad 50, formed of some nonmagnetic material, that can be selectively extended from the housing in order to engage the earth formation 12. As hereinbefore described, a switch unit and amplifier circuit 51 applies a signal from the device 47 to a conductor 52 in cable 53 for transmission to the earth's surface. The signal in the conductor 52 then is converted into an output that corresponds to the free fluid index by a computation circuit (not shown) such as the circuit 22 in FIG. 1.

The sonic device 45 is positioned in general alignment with the vertical axis of the borehole 11 by bowsprings 54, or the like. Typically, the sonic device 45 comprises a sonic energy transmitter 55 and sonic energy receivers 56 and 57. The receivers 56 and 57 are spaced vertically above the transmitter 55 at different distances in order to intercept at different times each pulse of sonic energy from the transmitter 55.

A signal that corresponds to the interval, $\Delta t$, between the arrival times of each sound pulse at the receivers 56 and 57 is transmitted to a sonic porosity function former circuit 63 on the earth's surface through conductor 61 in the armored cable 53. Because the $\Delta t$ signal corresponds to the sonic energy travel time through the formation over a distance at least equal to the separation between the receivers 56 and 57, the signal is a measure, in part, of some of the characteristics of the earth formation 12, such as the speed of sound within the formation. This sonic interval time ($\Delta t$) is related to the sonic-derived formation porosity, $\phi_s$, by the equation:

$$\Delta t = \phi_s \Delta t_f + (1 - \phi_s) \Delta t_{ma} \quad (7)$$

where $\Delta t_f$ is the transit time of the pore fluid, and $\Delta t_{ma}$ is the sonic transit time in the sand grains, which are known values.

The $\Delta t$ signal is converted in accordance with Equation 7 into an output that corresponds to $\phi_s$ through the sonic porosity function former circuit 63. The sonic porosity circuit 63 may comprise, for example, operational amplifiers with selectively connected input and feedback resistances which change the $\Delta t$ signal into an output signal in conductor 64 that indicates the earth formation porosity. As hereinbefore considered, the sonic device 45 is particularly accurate in clean sand formations. If shale is present, however, a shale correction should be applied to the porosity signal in the conductor 64.

The $\phi_s$ signal in the conductor 64 and the signal from the nuclear magnetic logging device 47 in the conductor 52 then are applied to the permeability function former circuit 42 as shown in FIG. 1 and the free fluid index computation circuit 22, respectively. The free fluid index is combined in the permeability circuit 42 (FIG. 1) in accordance with Equation 6 to produce an output signal that represents formation permeability, $k$, which is recorded in the manner previously described.

Turning again to FIG. 1, if the formation 12 is a gas-bearing formation, Equation 6 is only approximately valid.

The presence of gas within the formation 12, moreover, can be identified to a high degree of accuracy, and an appropriate adjustment to Equation 6 can be introduced to compute a more accurate value of formation permeability.

Accordingly, a comparison of $\phi - FFI$ with the resistivity of the formation water, $R_w$, enables gas-bearing formations to be identified. A suitable formation water resistivity value can be obtained from formation water samples, or the like. Thus, for sand zones that have a maximum hydrocarbon saturation, the irreducible water saturation is $$S_{wirr}^2 = \frac{.81 R_w}{\phi^2 R_t} \quad (8)$$

where $R_t$ is the true resistivity of the uncontaminated formation 12.

Rewriting and rearranging equation 5:

$$S_{wirr} = \frac{\phi - FFI}{\phi} \quad (9)$$

Substituting Equation 9 in Equation 8 and rearranging terms:

$$R_t = \frac{.81 R_w}{(\phi - FFI)^2} \quad (10)$$

Figure 3:
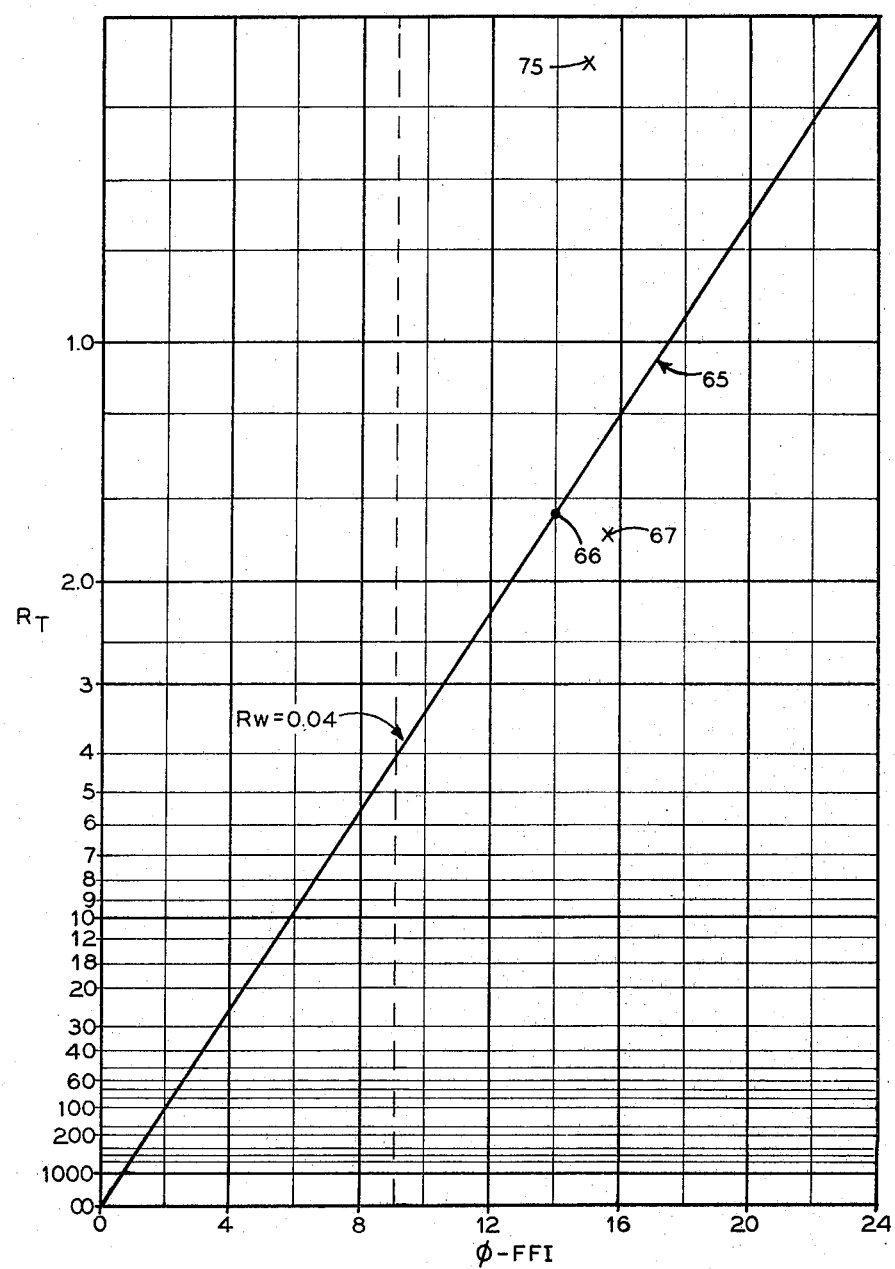
FIG. 3 is a graph of the difference between formation porosity and the free fluid index as a function of the total resistivity of the formation to indicate the absence of oil or the presence of gas, and the like, in accordance with the invention.

Because $R_w$ is known, $R_t$ can be computed if oil is present in the formation 12. Accordingly, an inverse square root graph of $R_t$ as a function of $\phi - FFI$, as shown in FIG. 3, produces a straight line 65, the slope of which is a function of $R_w$.

For example, in order to draw the line 65, it is assumed that a completely dry formation ($S_{wirr}=0$) has an infinite resistance. This assumption determines the set of coordinates $(0, \infty)$ at the origin of the graph. Because the slope of the line 65 is determined by the measured value of $R_w$, and the coordinates $(0, \infty)$ are known, the line 65 may be constructed readily. To simplify the construction of the line 65, however, a second set of coordinates is selected. This second set of coordinates is derived by combining in Equation 10 the measured value of $R_w$ and a reasonable assumed value of $R_t$ in order to solve for $\phi - FFI$. For example, if $R_w = 0.04$ and $R_t$ is assumed to have a value of 4:

$$4 = \frac{.81(.04)}{(\phi - FFI)^2}$$

$$46(\phi - FFI = .09)$$

For illustrative purposes, the numerical values of the expression $\phi - FFI$ on the abscissa of the graph in FIG. 3 are expressed as integers rather than as decimal values. Consequently, two sets of coordinates are developed, $(0, \infty)$ and $(9, 4)$, that enable the line 65 to be drawn on the graph in FIG. 3.

Illustratively, if the fluid content of the pores is at irreducible water saturation, and the balance of the porous volume contains oil, for a value of $\phi - FFI = 14$ and a measured $R_t = 1.7$ (which may be obtained from a separate or simultaneously run induction log), a point 66 is identified on the line 65. If, however, a value of $\phi - FFI = 15.5$ is observed, together with a measured value of about $R_t = 1.8$, a point 67 is identified that is below and to the right of the line 65. The displacement between the point 67 and the line 65 is a clear indication of gas in the formation under study. In this instance, values of permeability, $k$, are slightly in error if they are computed in accordance with Equation 2.

It will be recalled that gas formations produce a measurement of $\phi_d$ that is too large, and a value of FFI that is too small. Accordingly, in FIG. 1 an error circuit 68 for applying a gas correction to the permeability calculation contrasts the observed $\phi_d$ and FFI signals applied to the conductors 41 and 23, respectively, with a calculated value of $\phi_d - FFI$, computed as indicated in Equation 10. Thus, rearranging Equation 10:

$$(\phi_d - FFI)_{calc} = \left(\frac{.81 R_w}{R_t}\right)^{1/2} \quad (11)$$

In this instance the actual value of the formation $R_t$ must be substituted in the Equation 11 in order to enable $(\phi_d - FFI)_{calc}$ to be computed. $R_t$ can be measured through a separately or simultaneously run indication log in the manner described in more complete detail, for example, in U.S. Patent No. 3,051,892, granted to Owen H. Huston on Aug. 28, 1962 for "Electromagnetic Well Logging Systems" and assigned to the same assignee as the invention described herein. $(\phi_d - FFI)_{calc}$, computed in the foregoing manner, then is contrasted with the difference between the observed values of $\phi_d$ and FFI from the conductors 41 and 23, $(\phi_d - FFI)_{obs}$, to provide corrected values of $\phi_d$ and FFI through the following equations:

$$\phi_{d\,corr} = \phi_d - .37[(\phi_d - FFI)_{obs} - (\phi_d - FFI)_{calc}] \quad (12)$$

$$FFI_{corr} = FFI + .63[(\phi_d - FFI)_{obs} - (\phi_d - FFI)_{calc}] \quad (13)$$

The error circuit 68, as shown in FIG. 1, solves these equations by combining the observed $\phi_d$ and FFI signals in the conductors 41 and 23 with inputs that correspond to the measured values of the true formation resistivity, $R_t$, and the formation water resistivity, $R_w$, from potentiometers 70 and 71, respectively. These three signals, $\phi_d$, FFI, $R_w$ and $R_t$, then are manipulated by the error circuit 68 in accordance with Equations 11, 12 and 13 to provide output signals for the recorder 44 in conductors 73 and 74 that correspond to $\phi_{d\,corr}$ and $FFI_{corr}$, respectively.

The conductors 73 and 74 also apply the $\phi_{d\,corr}$ and $FFI_{corr}$ to the permeability function former circuit 42. The permeability circuit 42 applies these corrected density and free fluid index signals to the solution of Equation 6 in order to produce an accurate value of formation permeability, $k$, if the formation 12 contains gas.

Because $\phi_{d\,corr} = \phi_d$, and $FFI_{corr} = FFI$, in non-gas bearing formations, the permeability circuit 42 responds to signals in the conductors 73 and 74 from the error circuits 68 only when $\phi_{d\,corr} \neq \phi_d$ and $FFI_{corr} \neq FFI$. Thus, a gas correction automatically is applied to the permeability calculation when gas is present in the formation 12 as indicated by the foregoing inequality.

The fomation characteristics, porosity, free fluid index, and true formation resistivity can be measured in one logging run with a combination tool or measured through separately run logs, in which the logging signals are recorded on magnetic tape. These signals subsequently can be played back simultaneously to a computer for appropriate computational treatment as described herein.

Turning once more to FIG. 3, if $\phi - FFI = 15$, Equation 10 identifies a point 75 that is above and to the left of the line 65. The position of the point 75 relative to the line 65 indicates that the formation is water-bearing and contains no hydrocarbons.

It will be obvious to those skilled in the art that various changes and modifications may be made therein without departing from the invention, and it is, therefore, intended to cover all such changes and modifications as fall within the true spirit and scope of the invention.

What is claimed is:

1. A borehole logging system for measuring the permeability of an earth formation comprising means for producing a signal that corresponds to the porosity of the earth formation, a means for producing a signal that corresponds to a characteristic displacement function of the magnetically polarizable fluid within the formation, and circuit means for combining said porosity signal and said polarizable fluid signals to produce a signal that indicates the permeability of the formation to the flow of fluids therethrough.

2. A borehole logging system for measuring the permeability of an earth formation comprising a source of radiation, detector means spaced from said source for measuring the attenuation of said radiation in the earth formation, circuit means responsive to said detector means for producing a signal that corresponds to the porosity of the earth formation, magnetic excitation means for selectively polarizing at least some of the magnetic moments of the hydrogen in the formation fluid, circuit means responsive to said magnetic excitation means for producing a signal that corresponds to a displacement characteristic of the polarized fluid within the earth formation, and further circuit means for combining said porosity and said fluid signals to provide an indication of the permeability of the earth formation.

3. A borehole logging system for measuring the permeability of an earth formation comprising means for producing a signal that corresponds to the porosity of the earth formation, means for producing a signal that corresponds to a function of at least some of the magnetically polarizable fluid in the earth formation, and circuit means for combining said signals to provide an indication of the permeability of the earth formation according to the equation:

$$k^{1/2} = \frac{250\phi^3}{1 - \frac{FFI}{\phi}}$$

where $k$ is the formation permeability, $\phi$ is the formation porosity and FFI is the index of said magnetically polarizable fluid.

4. A borehole logging system for measuring the permeability of an earth formation comprising a sonic energy transmitter, at least two sonic energy receivers that produce signals that are combined to measure the sonic transmission characteristics of the earth formation, circuit means responsive to said sonic energy receiver signals to produce a signal that corresponds to the porosity of the earth formation, magnetic excitation means for producing a signal that is related to the fluid content of the earth formation, and circuit means responsive to said fluid content signal and said porosity signal to provide an indication of the permeability of the earth formation.

5. A borehole logging device for determining the permeability of an earth formation comprising a housing for transport through the earth formation, a source of gamma radiation connected to said housing, first and second gamma radiation detectors connected to said housing spaced at different distances longitudinally from said gamma radiation source, magnetic means connected to said housing for producing a signal that corresponds to the magnetic moments of the hydrogen in at least a part of the formation fluid, biasing means connected to said housing for urging said magnetic means and said detectors against the earth formation, circuit means responsive to said detectors for combining the responses of said detectors to produce a signal that is related to the porosity of the earth formation, further circuit means associated with said magnetic means for producing a signal that corresponds to the free fluid index of the earth formation fluid, and calculating means for combining said free fluid index signal and said porosity signal to provide an indication of the permeability of the earth formation to the flow of fluid therethrough in accordance with the equation:

$$k^{1/2} = \frac{250\phi^3}{1 - \frac{FFI}{\phi}}$$

where $k$ is the permeability of the formation, $\phi$ is the porosity of the earth formation, and FFI is the free fluid index of the formation.

6. A borehole logging device for determining the permeability of an earth formation traversed by a borehole comprising a housing for transport through the borehole, a sonic energy transmitter connected to said housing, at least two sonic energy receivers within said housing and spaced longitudinally from said sonic energy transmitter for individual response to the transmitted sonic energy to produce a combined formation characteristic response, means for positioning said transmitter and said receivers substantially in alignment with the axis of the borehole, magnetic coil means for exciting the magnetic moments of at least some of the hydrogen in the earth formation fluid, a pad for housing said magnetic coil means, biasing means connected to said housing for urging said pad and said coil means therein against the earth formation, circuit means responsive to said sonic energy receivers for producing a combined signal that corresponds to the porosity of the earth formation, further circuit means responsive to said magnetic coil means to provide a signal that is related to the free fluid index of the earth formation, and computer means for combining said porosity and said free fluid index signals according to the equation:

$$k^{1/2} = \frac{250\phi^3}{1 - \frac{FFI}{\phi}}$$

where $k$ is the permeability of the formation, $\phi$ is the porosity of the earth formation, and FFI is the free fluid index of the formation.

7. A borehole logging method for determining the permeability of an earth formation comprising the steps of measuring the porosity of the earth formation, exciting the magnetic moments of the hydrogen of at least some of the fluid within the earth formation, measuring the excitation of said fluid magnetic moments, and combining said porosity measurement with said fluid measurement to determine the permeability of the earth formation to the flow of fluids therethrough.

8. A borehole logging system for measuring the permeability of an earth formation comprising means for producing a signal that corresponds to the porosity of the earth formation, means for producing a signal that corresponds to a function of the magnetically polarizable fluid within the formation, circuit means for combining said porosity signal and said polarizable fluid signal to produce another signal that indicates the permeability of the formation to the flow of fluid therethrough, means for indicating the electrical resistance characteristics of the earth formation and further circuit means for combining said porosity signal and said polarizable fluid signal with said indicated resistance characteristic to correct said permeability signal for the presence of gas in the earth formation.

9. A borehole logging system according to claim 8 wherein said further circuit means comprises means for combining said porosity and polarizable fluid signals with said resistance characteristics in accordance with the equation:

$$(\phi_d - FFI)_{calc} = \left(\frac{.81 R_w}{R_t}\right)^{1/2}$$

where:

$$(\phi - FFI)_{calc} \neq (\phi_d - FFI)_{obs}$$

in which $(\phi_d - FFI)_{obs}$ is the difference between said porosity signal and said polarizable fluid signal; $R_w$ is the resistivity of the formation fluid; and $R_t$ is the true resistivity of the formation.

10. A borehole logging system for measuring the irreducible water saturation of an earth formation comprising means for producing a signal that corresponds to the porosity of the earth formation, means for producing a signal that corresponds to a function of at least some of the magnetically polarizable fluid in the earth formation, and circuit means for combining said signals to provide an indication of permeability of the earth formation according to the equation:

$$\frac{\phi - FFI}{\phi} = S_{wirr}$$

where $\phi$ is the formation porosity, FFI is the index of said magnetically polarizable fluid and $S_{wirr}$ is the irreducible water saturation of the formation.

11. A borehole logging tool for traversing an earth formation comprising a housing, porosity measuring means movable with said housing for producing a signal from which indications can be derived of the porosity of the formation, magnetic precession measuring means movable with said housing for producing a signal from which indications of the free fluid index of the formation can be derived, and means responsive to said measuring means for processing said signals in correlation with movement of said housing past the formation to provide further signals from which indications of formation permeability can be derived.

12. A borehole logging tool according to claim 11 wherein said porosity measuring means comprises a source of gamma radiation movable with said housing, and gamma radiation detection means spaced from said source and movable with said housing in order to produce a signal from which said formation porosity indications can be derived.

13. A borehole logging tool according to claim 11 wherein said porosity measuring means comprises a sonic energy transmitter movable with said housing, and sonic energy receiving means spaced from said transmitter and movable with said housing in order to produce a signal from which said formation porosity indications can be derived.

References Cited

UNITED STATES PATENTS

| | | | |
|---|---|---|---|
| 3,258,681 | 6/1966 | Brown et al. | 324—0.5 |
| 3,311,876 | 3/1967 | Lee. | |
| 3,320,803 | 5/1967 | Lord | 73—152 |

RICHARD C. QUEISSER, Primary Examiner

J. W. MYRACLE, Assistant Examiner